United States Patent [19]

Inoue

[11] Patent Number: 4,628,172
[45] Date of Patent: Dec. 9, 1986

[54] GAP ENERGIZING SYSTEM FOR TW ELECTROEROSION

[75] Inventor: Kiyoshi Inoue, Tokyo, Japan

[73] Assignee: Inoue-Japax Research Incorporated, Kanagawa, Japan

[21] Appl. No.: 653,191

[22] Filed: Sep. 21, 1984

[30] Foreign Application Priority Data

| Sep. 21, 1983 | [JP] | Japan | 58-173171 |
| Sep. 21, 1983 | [JP] | Japan | 58-173172 |
| Sep. 22, 1983 | [JP] | Japan | 58-174102 |
| Apr. 9, 1984 | [JP] | Japan | 59-70581 |

[51] Int. Cl.$^4$ .................................... B23H 7/04
[52] U.S. Cl. ................... 219/69 W; 204/206; 204/224 M; 219/69 D
[58] Field of Search ............... 219/69 R, 69 D, 69 M, 219/69 W; 204/129.2, 129.25, 129.5, 206, 224 M

[56] References Cited

U.S. PATENT DOCUMENTS

| 4,160,717 | 7/1979 | Navaro et al. | 204/224 M |
| 4,205,212 | 5/1980 | Ullmann et al. | 219/69 W |
| 4,263,493 | 4/1981 | Kilcher | 219/69 W |
| 4,417,118 | 11/1983 | Miyano | 219/69 W |
| 4,495,393 | 1/1985 | Janicke | 219/69 W |

FOREIGN PATENT DOCUMENTS

| 938348 | 12/1973 | Canada | 219/69 W |
| 3129716 | 4/1982 | Fed. Rep. of Germany | 219/69 W |
| 3303644 | 9/1983 | Fed. Rep. of Germany | 219/69 W |
| 3317826 | 11/1983 | Fed. Rep. of Germany | |
| 157435 | 12/1980 | Japan | 219/69 W |
| 149119 | 9/1982 | Japan | 219/69 W |
| 58-94917 | 6/1983 | Japan | 219/69 W |
| 932715 | 6/1983 | Japan | 204/129.25 |

*Primary Examiner*—A. D. Pellinen
*Assistant Examiner*—Geoffrey S. Evans
*Attorney, Agent, or Firm*—Finnegan, Henderson, Farabow, Garrett & Dunner

[57] ABSTRACT

A gap energizing system for TW electroerosion, in which a fluid delivery assembly has an elongate internal fluid passage longitudinally traversed by a straight-line path for a traveling wire electrode traversing a workpiece while defining a machining gap therewith. The passage is supplied with a machining fluid from an external fluid source and has at its end a nozzle outlet for discharging the supplied fluid as an envelop flow surrounding the electrode towards the workpiece and into the machining gap. Disposed in the internal passage are a precision guide member and an electrode contact means. A workpiece contact means is movably mounted on the fluid delivery assembly so as to surround the electrode passing through the nozzle outlet and operably arranged for movement parallel to the straight-line electrode travel path towards the workpiece to make contact therewith for energizing the machining gap, only upon development of a fluid pressure in the fluid passage representing delivery of the machining fluid into the machining gap.

8 Claims, 2 Drawing Figures

GAP ENERGIZING SYSTEM FOR TW ELECTROEROSION

FIELD OF THE INVENTION

The present invention relates to TW (traveling-wire) electroerosion and, more particularly, to a gap energizing system for properly initiating and performing a TW electroerosion machining operation.

BACKGROUND OF THE INVENTION

The term "electroerosion" is used herein to refer to a machining process in which electric energy is supplied across a machining gap formed between a tool electrode and a conductive workpiece and flushed with a machining fluid to remove material from the workpiece by the action of successive time-spaced electrical discharges effected across the gap (electrical discharge machining or EDM), the action of electrochemical or electrolytic solubilization (electrochemical machining or ECM) or a combination of these actions (electrochemical-discharge machining or ECDM). In EDM, the machining fluid is commonly a liquid which is basically electrically nonconductive or of dielectric nature and typically constituted by deionized water, a liquid hydrocarbon or a combination of such water and hydrocarbon. The electric energy is supplied commonly in the form of a succession of voltage pulses which result in a corresponding succession of pulsed, discrete electrical discharges across the machining gap. In ECM, the machining fluid is commonly a liquid electrolyte which is naturally conductive, and the machining current may be a direct current but is preferably in the form of pulses or pulsating current. In ECDM, the machining fluid is typically a liquid having both dielectric and electrolytic natures and may be tap water or water deionized to retain weak conductivity.

In traveling-wire (TW) electroerosion, the tool electrode is constituted by a continuous electrode element which is typically a conductive wire having a diameter ranging from 0.05 mm to 0.5 mm, but may take the form of a tape or ribbon of similar thickness. Such electrode is broadly and generally referred to herein also as a wire-like electrode. In the TW electroerosion process, the continuous electrode is continuously dispensed from an electrode supply, e.g. a wire reel, to continuously travel along a straight-line path traversing and defined across the workpiece and is eventually collected into or onto collection means, e.g. a takeup reel. This straight-line path is established by at least one pair of guide members disposed across the workpiece to maintain the traveling electrode as straight as possible and precisely in erosive cutting relationship with the workpiece across the machining gap flushed with the machining fluid while the straight-line path and the workpiece are relatively displaced along a programmed cutting path as electroerosion proceeds across the gap. It is thus critical to ensure that these guide members are properly arranged and positioned relative to a prescribed instantaneous position of the workpiece inasmuch as these positioning members directly affect the accuracy of cut which is to proceed with the programmed cutting path.

The machining liquid is continuously supplied into the machining gap typically by means of a pair of nozzle assemblies which are disposed at the opposite sides of the workpiece. It is desirable that each assembly have a nozzle outlet open towards the machining gap and the nozzle outlet accommodate the traveling electrode therein so that the machining fluid is discharged, as an envelop flow surrounding the electrode, towards the workpiece and into the machining gap. This arrangement has been found to be advantageous to serve to maintain the required linearity of the traveling wire, promote renewal of the machining fluid and to cool the electrode and the workpiece, in the cutting zone. The electrode and the workpiece tend to be heated up by the electrical discharge or high-density machining current. The electrically energized length of the electrode tends also to be heated up because of the small cross-sectional area of that length through which such current must pass.

The electroerosive energization of the machining gap is thus established by connecting one terminal of an erosion power supply electrically with the electrode and its other terminal electrically with the workpiece. The electrode and the workpiece can be energized by bringing the electrical contacts for the electrode and the workpiece into respective contact with the two terminals of the electric power supply. During the machining operation it is critical that these members be held in proper electrical contact with the traveling electrode and the workpiece and that the energized portions of the latter two be held in proper cooling contact with the machining fluid. This also requires consideration as to how the guide members should best be arranged and their positions maintained. Also, in initiating the gap energization it is critical to ensure that these members are properly positioned and the nozzle means commence operating to properly flush the gap with the machining fluid before the gap is electrically energized. While various systems have so far been proposed or suggested as to these essential elements in TW electroerosion machines, it has been found that they both individually and in combinations fail to meet the foregoing critical requirements to achieve an optimum TW-electroerosion result.

OBJECTS OF THE INVENTION

Among others, therefore, it is an important object of the present invention to provide a novel and improved gap energization system for TW electroerosion or a novel and improved electroerosion machine incorporating the same, which would best meet the requirements discussed in the foregoing.

SUMMARY OF THE INVENTION

In accordance with the present invention there is provided a gap energizing system for TW electroerosion, which comprises: a fluid delivery assembly having an internal fluid passage longitudinally traversed by a straight-line path for a traveling wire-like electrode traversing a workpiece while defining a machining gap therewith, the said passage being supplied with a machining fluid from an external fluid source and ending with a nozzle outlet for discharging the supplied fluid as an envelop flow surrounding the electrode towards the workpiece and into the machining gap; guide means disposed in the said internal fluid passage for holding the axis of the electrode traveling therethrough in alignment with the said straight-line path; first contact means disposed in the said internal fluid passage and maintained in contact with the traveling electrode for electrically energizing the same; and second contact means movably mounted on the said fluid delivery assembly so as to surround the electrode passing through the said nozzle outlet and operably arranged for movement parallel to the said straight-line path towards the workpiece to make contact therewith for energizing the machining gap, only upon development of a fluid pressure in the said passage representing delivery of the machining fluid into the machining gap.

Preferably, the fluid delivery assembly comprises: a first hollow member supported by a carriage and having a fluid inlet chamber surrounding the said straight-line path and constituting an inlet portion of the said fluid passage; and a second hollow member having at its one end the said nozzle outlet and towards its other, open end slidably fitted into and supported by the first hollow member so as to be capable of longitudinally projecting therefrom towards the workpiece, the said fluid inlet chamber when supplied with the machining fluid from the external fluid source being loaded and pressurized therewith to pass it via an inner duct and the outlet nozzle in the second hollow member and in contact with the guide means and the first contact means onto the workpiece and simultaneously to urge the second member to slidably move in the first hollow member to bring the nozzle outlet proximate with the workpiece, the said second contact means being secured to one of the first and second hollow members.

Specifically, the said second contact means may be secured to the second hollow member to lie relative to the nozzle outlet so that when the nozzle outlet is brought proximate with the workpiece in response to development of the fluid pressure in the inlet chamber, the second contact means comes into contact with the workpiece.

Alternatively, the second contact means may be secured to said first hollow member to normally lie surrounding said nozzle outlet and the system may further comprise means drivingly coupled with the said carriage and operable for moving the first hollow member towards the workpiece to establish contact of the second contact means therewith after a predetermined delay time subsequent to delivery of the machining fluid into the inlet chamber which delay time is sufficient to bring the nozzle outlet proximate with the workpiece.

Preferably, the first contact means is secured to the second hollow member to lie in the duct interior thereof adjacent the said nozzle outlet and in contact with the electrode. The guide member may also be secured to the second hollow member to lie in said duct interior thereof adjacent the said nozzle outlet and in guiding contact with the electrode.

BRIEF DESCRIPTION OF THE DRAWINGS

The foregoing and other objects and features of the present invention as well as advantages thereof will become more readily apparent from a reading of the following description taken with reference to the accompany drawings in which.

SPECIFIC DESCRIPTION

Figure 1:
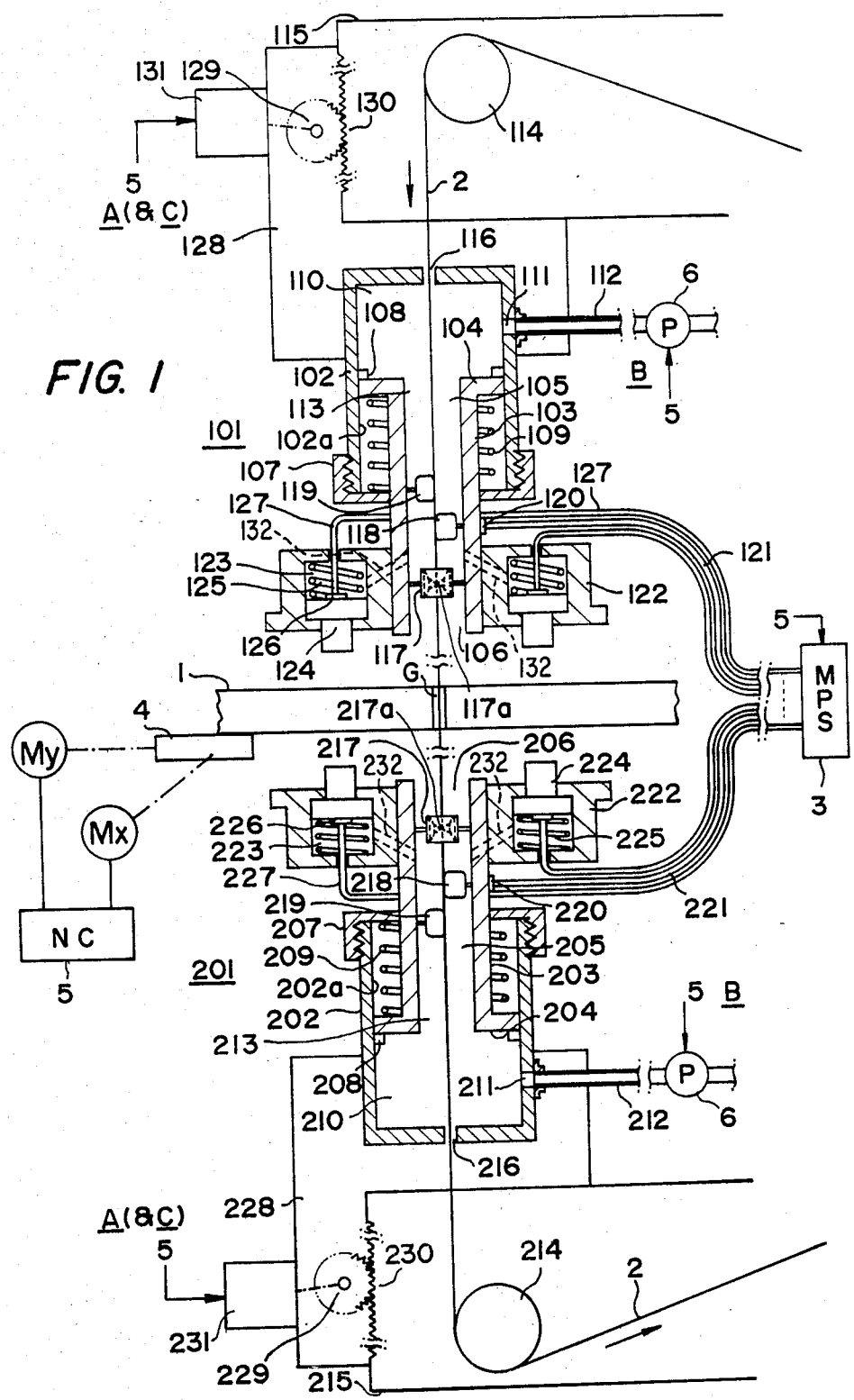
FIGS. 1 and 2 are diagrammatic longitudinal sectional views illustrating a gap energizing system for TW electroerosion embodying the present invention.
Figure 2:
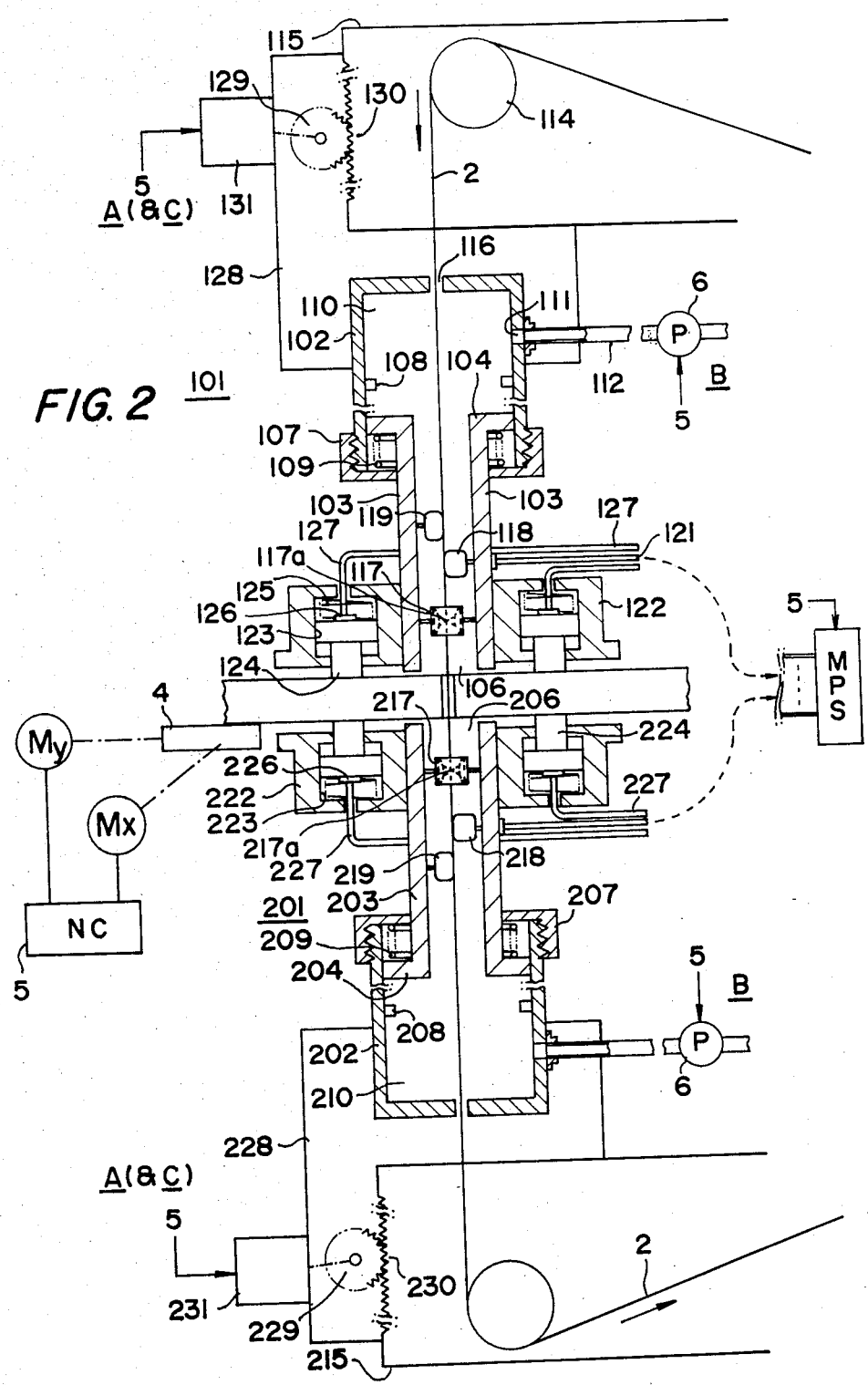

Referring now to FIGS. 1 and 2, the system shown includes two fluid delivery assemblies 101 and 201 disposed respectively at the opposite sides of a conductive workpiece 1. The two assemblies as shown are basically the same in structure with corresponding components arranged substantially symmetrically with respect to the workpiece 1. Each assembly 101, 201 comprises a first hollow member 102, 202 having an inner cylindrical wall 102a, 202a and a second hollow member 103, 203 with a flange or a centrally bored annular disk 104, 204 slidably fitted into the inner cylindrical wall 102a, 202a. Each second member constituting a nozzle in the system has an inner duct 105, 205 and at its forward end a nozzle outlet 106, 206 open towards the workpiece 1. A cup-shaped member 107, 207 with a central bore slidably receiving the second member 103, 203 is threaded to close and thus complete the first hollow member 102, 202 so that a length of the second hollow member with the nozzle outlet 106, 206 projects therefrom and the remaining length towards the flanged portion is slidably and thus movably inserted into the first hollow member 102, 202. A ring stopper 108, 208 is secured onto the cylindrical wall 102a, 202a to ensure a minimum projecting length of the second hollow member 103, 203 from the first hollow member 102, 202. Shown as disposed to encircle the second hollow member 103, 203 within the first hollow member 102, 202 is a helical spring 109, 209 held between the flange or disk 104, 204 and the cap 107, 207 to give a resilient bias countering the forward movement of the second hollow member 103, 203. In the upper assembly 101, this spring also effectively serves to hold the second hollow member 103 against gravitational fall. In the lower assembly 201, this function is effectively served by the ring stopper 208.

The first hollow member 102, 202 in each assembly 101, 201 also includes an inlet fluid chamber 110, 210 which is in part defined with the flange or disk 104, 204 and provided with a fluid inlet port 111, 211 that communicates with a source of machining fluid (not shown) via a supply conduit 112, 212. In each assembly 101, 201, the inlet chamber 111, 211 and the duct 105, 205 ending with the nozzle outlet 106, 206 together constitute an elongate fluid passage 113, 213 for the machining fluid (e.g. liquid dielectric in EDM) to be delivered under pressure into a machining zone in the workpiece 1. Each assembly 101, 201 is designed so that when the inlet chamber 110, 210 is loaded with the pressurized fluid passing into the duct 105, 205, the fluid pressure in the chamber acts on the flange or annular disk 104, 204 to displace the hollow member 103, 203 and to bring it proximate with the workpiece 1.

The two assemblies 102 and 202 are arranged so that the elongate fluid passage 113, 213 is longitudinally traversed by a straight-line path for a wire-like electrode 2 which is established between a pair of guide rollers 114 and 214 which are disposed above and below the assemblies 101 and 201 as securely mounted on support members 115 and 215, respectively. The electrode 2 is shown to pass for travel vertically along this path, e.g. from up to down as indicated by the arrow, through the workpiece 1. It may be assumed that the electrode 2 dispensed from a supply reel (not shown) is guided over the upper guide roller 114 to pass through the upper assembly 101, the workpiece 1 and the lower assembly 201 and then guided over the lower guide roller 214 for take up onto a suitable takeup means (not shown). To enable passage by the electrode 2, in each assembly 101, 201 the first hollow member 102, 202 is formed with a guide opening 116, 216 at a position falling on the straight-line electrode travel path.

Each assembly 101, 201 also accommodates a precision guide member 117, 217 and a pair of electrode contact members 118, 218 and 119, 219. All these elements are shown as securely carried by the nozzle member 103, 203. It is desirable that the precision guide member 117, 217 be disposed adjacent the nozzle outlet 106, 206 in the duct 105, 205. While the contact members 118, 218 and 119, 219 may be disposed in the fluid inlet chamber 110, 210, it has been found desirable that they be also disposed in the duct 105, 205 and advantageously adjacent the nozzle outlet 106, 206. In a preferred arrangement, the precision guide member 117, 217 is disposed closer to the workpiece 1 than the contact members 118, 218 and 119, 219. It should be noted that when the assemblies 101, 201 are brought into machining positions across the workpiece 1, the guide members 117 and 217 define a free straight-line stretch of the electrode which is desirably of a minimum length to ensure its maximum linearity against deflection. Preferably, each precision guide 117, 217 is of "die" type with an annular guide ring 117a, 217a composed of friction-resistant material such as diamond and having an inner diameter slightly greater than that of the electrode 2 being fitted therein. The contact member 118, 218 may be a small conductive roller or square plate with round corners and is connected to a contact screw 120, 220 to which is secured an electrical conductor 121, 221 leading from a terminal of one pole (e.g. negative) of an electroerosion machining power supply 3 to electrically energize the wire-like electrode 2. The contact member 119, 219, similar in shape to the contact member 118, 218, is disposed at the opposite side thereof with respect to the electrode 2 and positioned to hold the electrode in firm sliding contact therewith. By disposing the contact members 118 and 119, 218 and 219 adjacent the nozzle outlet 106, 206, the electrically energized length of electrode 1 can be minimized, thus reducing the electrical resistance thereof in the circuit to a minimum and hence maximizing the machining current delivery efficiency.

Disposed to surround the forward end portion of each nozzle member 103, 203 is an annular member 122, 222 which in a parallel relationship with the workpiece 1 is preferably flanged closer to the workpiece 1 and has a central bore into which the forward end portion of the nozzle member 103, 203 is securely fitted. The annular member 122, 222 has a plurality of (e.g. eight) cylindrical bores 123 which are equi-distantly spaced apart from one another about the nozzle member 103, 203, each bore 123, 223 retaining a flanged cylindrical contact member 124, 224. The flange portion of the contact member 124, 224 in the bore 123, 223 is pressed by a spring 125, 225 to project its cylindrical contact portion and maintain its forward end face a small distance ahead of the nozzle outlet 106, 206 and parallel with the workpiece 1. The contact member 124, 224 has secured on its flange surface a contact screw 126, 226 to which is secured a conductor 127, 227 leading to a terminal of the other pole (e.g. positive) of the machining power supply 3 for electrically energizing the workpiece 1. Instead of a plurality of bores 123, 223, a single annular bore may be formed in each annular support member 122, 222 to retain a single flanged annular contact member.

The first hollow member or housing 102, 202 in each assembly 101, 201 is secured to a carriage 128, 228. The latter is movably mounted on the support member 115, 215 to displace the housing 102, 202 vertically up and down. In the arrangement illustrated, the carriage has a gear or pinion 129, 229 in mesh with a rack 130, 230 secured to the support member 115, 215. The pinion 129, 229 is rotatable by a motor 131, 231 secured to the carriage 128, 228, in one direction to move down the housing 102, 202 and in the other direction to move up the housing 102, 202. The support members 115 and 215 may be parallel arm members horizontally extending from a vertical column (not shown) standing on a base (not shown) in a standard EDM machine design. Also in the standard design, the workpiece 1 is securely mounted on a cross-table 4 which is horizontally movable by a pair of motors Mx and My. These motors are driven by command signals furnished from a control unit (e.g. NC) 5 to displace the workpiece 1 in an X-Y plane relative to the electrode 2 along a programmed cutting path to generate a contour corresponding thereto in the workpiece 1. A pump 6 is also provided for each fluid conduit 112, 212 or commonly for both to draw the machining fluid from the fluid source (not shown).

In operation, the motors 131, 231 are driven to position the assemblies 101 and 201 so that the nozzle outlets 106 and 206 are spaced respectively from the upper and lower surfaces of the workpiece 1 at a distance which is equal to a predetermined movement stroke of the nozzle member 103, 203 in each assembly 101, 201 (FIG. 1). The electrode 2 is now or has already been, driven to axially travel along the straight-line path, thus over the upper guide roller 114, through the upper guide opening 116, the upper electrode contact members 118, 119, through the upper precision guide member 117, the workpiece 1 and the lower precision guide member 217, in contact with the lower electrode contact members 218, 219, through the lower guide opening 216 and over the lower guide roller 214. The machining power supply 3 may then be brought into operation and thereupon the pump 6 may be actuated to commence drawing the machining fluid from the source. Immediately thereupon the inlet fluid chamber 110, 210 in each assembly will be loaded with the pressurized machining fluid which is passed into the duct 113, 213 and simultaneously acts on the flange 104, 204 to displace the nozzle member 103, 203 until the nozzle outlet 106, 206 comes proximate with the workpiece 1, while discharging the machining fluid onto the workpiece 1 and into the machining gap G defined therein with the traveling electrode 2. At the same time, the contact members 124, 224 will come into firm electrical contact with the workpiece 1 on the two opposite surfaces thereof (FIG. 2). When the contact members 124, 224 are brought in electrical contact with the workpiece 1 in the proximity of the cutting zone, the contact members 118, 119; 218, 219 have already established their electrical contact with the traveling electrode 2 so that the electroerosive machining current may immediately commence flowing across the machining gap G. In this manner, a premature energization of the machining gap prior to delivery of the machining fluid is effectively prevented. When the nozzle member 103, 203 advances resiliently under both the fluid and spring pressures to bring the nozzle outlet 106, 206 close to the workpiece 1, the contact member 124, 224 upon establishing contact with the workpiece will move slightly back against the pressure of the spring 125, 225 to establish a pressure equilibrium, a highly favorable electrical contact with the workpiece 1 which is maintained throughout the machining operation against all possible fluctuations in the machining conditions. While a major portion of the machining fluid discharged from the nozzle outlet 106, 206 in each assembly 101, 201 is led into the machining gap G for flow-out through the cut groove, a portion thereof is allowed to pass through a small clearance between the nozzle outlet 106, 206 and the workpiece 1 to effectively cool the workpiece contact members 124, 224 as well as the workpiece surfaces in the cutting zone while the electrode contact members 118, 119; and 218, 219 and hence the energized portion of the electrode 2 remain cooled by the machining fluid passing through the ducts 105 and 205.

In a modification of the arrangement shown in FIGS. 1 and 2, the space over the flange of the contact member 124, 224 in each bore 123, 223 in the support member 122, 222 is designed to communicate with the duct 105, 205 in the nozzle member 103, 203 of each assembly 101, 201 as shown in broken lines designated by reference numeral 132, 232. This modification utilizes the pressure of the machining fluid, in addition to or as an alternative of the pressure of the spring 125, 225, to continuously urge each contact member 124, 224 in more favorable pressure electrical contact with the workpiece 1.

In a further modified system, the support member 122, 222 carrying the contact members 124, 224 is securely carried by the housing member 102, 202, instead of the nozzle member 103, 203 as shown and previously described. In this system, in a first step the nozzle member 103, 203 is displaced under the fluid pressure to bring the nozzle outlet 106, 206 proximate with the workpiece 1. This step can be carried out by permitting the pump 6 to be actuated in response to a command signal B from the control unit 5. This step is carried out subsequent to the downward movement of each assembly 101, 201 to its predetermined initial position as previously described, which is effected in response to a command signal A furnished from the control unit 5 to the motor 131, 231. The step is followed by a second step in which the motor 131, 231 is actuated in response to a command signal C furnished from the control unit 5 after a predetermined delay time following the actuation of the pump 6 which time is sufficient for the nozzle outlet 106, 206 to come proximate with the workpiece 1. The motor 131, 231 is actuated by the command signal C to bring the contact member 124, 224 into a firm electrical contact with the workpiece 1.

What is claimed is:

1. A gap energizing system for TW electroerosion, comprising:
    a fluid delivery assembly having an internal fluid passage longitudinally traversed by a straight-line path for a traveling wire-like electrode traversing an electrically conductive workpiece while defining a machining gap therewith, said passage being supplied with a machining fluid from an external fluid source and ending with a nozzle outlet for discharging the supplied fluid as an envelop flow surrounding the electrode towards the workpiece and into said machining gap;
    guide means disposed in said internal passage for holding the axis of the electrode traveling therethrough in alignment with said path;
    first contact means disposed in said internal passage and maintained in contact with the traveling electrode therein for electrically energizing the same; and
    second contact means movably mounted on said fluid delivery assembly so as to surround the electrode passing through said nozzle outlet and operably arranged for movement parallel to said path towards the workpiece to make contact therewith for energizing the machining gap, only upon development of a fluid pressure in said passage representing delivery of the machining fluid into said gap.

2. The system defined in claim 1 wherein said fluid delivery assembly comprises:
    a first hollow member supported by a carriage and having a fluid inlet chamber surrounding said path and constituting an inlet portion of said fluid passage; and
    a second hollow member having at its one end said nozzle outlet and towards its other, open end slidably fitted into and supported by said first hollow member so as to be capable of longitudinally projecting therefrom towards the workpiece, said fluid inlet chamber when supplied with the machining fluid from said external source being loaded and pressurized therewith to pass it via an inner duct and said outlet nozzle in said second hollow member and in contact with said guide means and said first contact means onto said workpiece and simultaneously to urge said second member to slidably move in said first hollow member to bring said nozzle outlet proximate with the workpiece, said second contact means being secured to one of said first and second hollow members.

3. The system defind in claim 2 wherein said second contact means is secured to said second hollow member to lie relative to said nozzle outlet so that when the nozzle outlet is brought proximate with the workpiece in response to development of said fluid pressure in said inlet chamber, the second contact means comes into contact with said workpiece.

4. The system defined in claim 2 wherein said second contact means is secured to said first hollow member to normally lie surrounding said nozzle outlet, further comprising means drivingly coupled with said carriage and operable for moving said first hollow member towards the workpiece to establish contact of said second contact means therewith after a predetermined delay time subsequent to delivery of the machining fluid into said inlet chamber which time is sufficient to bring said nozzle outlet proximate with the workpiece.

5. The system defined in claim 2, claim 3 or claim 4 wherein said first contact means is secured to said second hollow member to lie in said duct interior thereof in contact with the electrode.

6. The system defined in claim 5 wherein said guide means is secured to said second hollow member to lie in said duct interior thereof in guiding contact with the electrode.

7. The system defined in claim 2, claim 3 or claim 4 wherein said guide means is arranged to lie within said duct interior of said second hollow member in guiding contact with the electrode.

8. The system defined in claim 7 wherein said first contact means is arranged to lie within said duct interior of said second hollow member in sliding contact with said electrode.

* * * * *